May 23, 1950 H. T. WINCHEL ET AL 2,508,982
SUPERREGENERATIVE RECEIVER
Filed Feb. 8, 1943
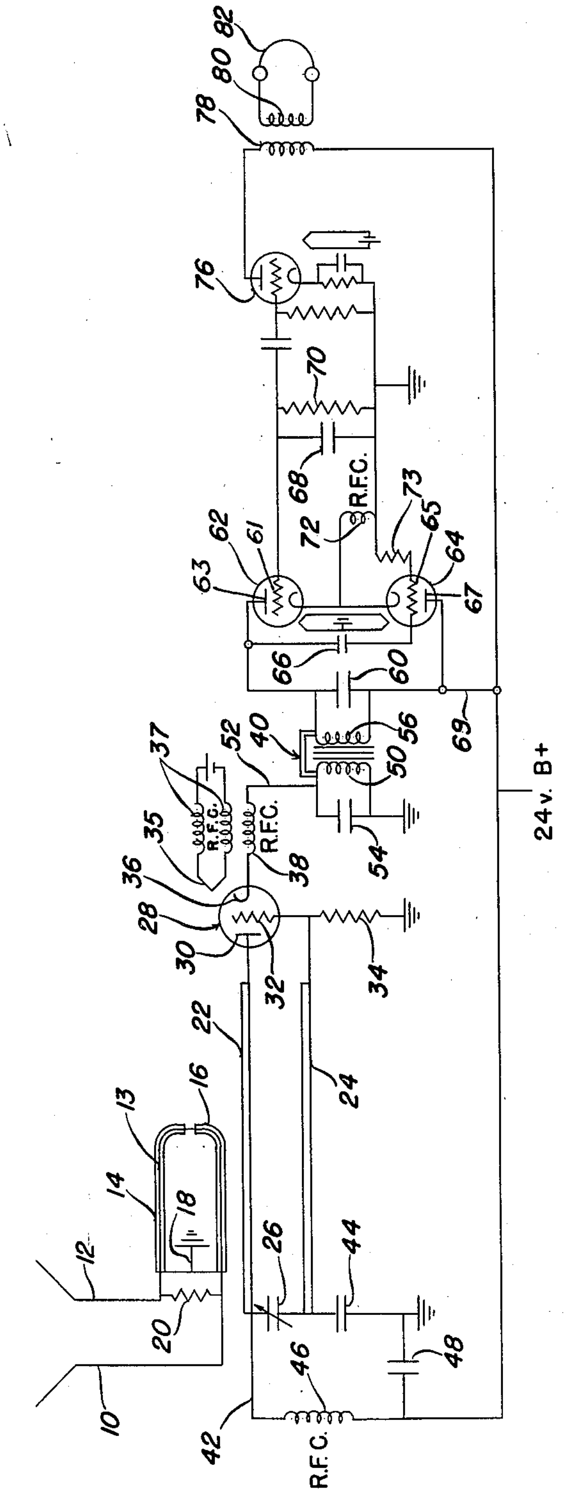
INVENTOR.
HENRY T. WINCHEL
EDMUND R. ROBUCK
BY H. W. Brelsford Patented May 23, 1950

2,508,982

UNITED STATES PATENT OFFICE 2,508,982

SUPERREGENERATIVE RECEIVER

Henry T. Winchel and Edmund R. Robuck, North Hollywood, Calif., assignors, by mesne assignments to Bendix Aviation Corporation, South Bend, Ind., a corporation of Delaware Application February 8, 1943, Serial No. 475,136

7 Claims. (Cl. 250—20)

This invention relates to receivers, and more particularly to a receiver employing the principles of superregenerative oscillators in a novel manner.

The invention provides a receiving circuit wherein a superregenerative oscillator is coupled to the receiving antenna and is quenched by a separate oscillator, the output of the superregenerative oscillator reacting in the quench circuit to produce an intelligence bearing frequency which is detected.

It is an object of the invention to provide a receiver employing a superregenerative oscillator having performance characteristics substantially equivalent to those of superheterodyne but retaining the low weight and manufacturing cost of the superregenerative receiver.

It is an object of the invention to provide a superregenerative receiver capable of operating reliably at low anode supply voltages; that is, about 25 volts as compared to the usual operation at 200 volts.

Another object is to provide a receiver of the superregenerative type in which the intelligence frequency components of the modulation on the incident wave are derived from the quench oscillator circuit.

Another object is to provide a superregenerative receiver having a substantially linear detection characteristic.

Another object is to provide a superregenerative receiver having linear mode detection and at the same time having good automatic volume control characteristics.

A further object is to provide a superregenerative receiver capable of continuing good performance in the presence of high field intensities.

Another object is to provide a superregenerative receiver having means to control the automatic volume control characteristics; that is, whether flat, increasing or decreasing with increased signal strength.

Another object of the invention is the provision of a novel, superregenerative quench circuit wherein audio frequency is detected at the same time quench frequency is generated.

It is another object to provide a receiver having a superregenerative oscillator wherein radiation from the antenna is reduced to a very low value which does not produce an interfering signal.

A further object is to provide a novel means of controlling selectivity by controlling the feedback circuit for the oscillator which may be controlled by varying the capacitance of a condenser.

Other objects and advantages of the invention will be apparent in the following description and claims.

This invention will be described with reference to a particular embodiment thereof designed for ultra high frequency reception. The invention is not limited to this embodiment since the principles and construction are applicable to superregenerative apparatus intended for operation in any portion of the radio frequency spectrum.

The drawing forming a part of this specification is a schematic diagram of an embodiment of the invention adapted for ultra high frequency reception.

Referring to the drawing, transmitted radio energy is intercepted by a balanced antenna including masts 10 and 12 which are preferably one-fourth wave length and spread outwardly with respect to each other to form a dipole antenna. These antennas are connected together to form a loop 13. The loop is shielded by tubes 14 and 16 which in turn are grounded at 18 to form an electrostatic shield. The antenna loop is shunted by a resistance 20. Resistance 20 provides a matching impedance for the antenna circuit. It also provides a means of absorbing energy introduced from the oscillator of the receiver so that this energy is substantially dissipated rather than being transmitted. Radiation from the oscillator is a negligible amount due to the loose coupling allowable with the high sensitivity of the superregenerative receiver.

The loop 13 is electromagnetically coupled to two metal rods 22 and 24 which are connected in series by a variable condenser 26, and these three elements together form a capacitance-inductance tuned circuit for the superegenerative oscillator tube 28. The circuit is tuned by condenser 26 to the incoming carrier frequency and the tube 28 is thereby caused to oscillate at that tuned frequency.

Rod 22 is connected to plate 30 of tube 28 and rod 24 is connected to grid 32, which is also connected to ground through a grid leak resistance 34. A cathode 36 is connected to ground through a radio frequency choke 38 and a transformer 40. A filament heater 35, having radio frequency chokes 37, is provided for cathode 36. Choke 38 cuts off the superregenerative oscillator frequency but allows quench frequency to pass.

The oscillator circuit is completed by a connection 42 to B+ at the outer end of plate rod 22, and a connection to ground at the outer end of grid rod 24, through a condenser 44. As will be explained later, the value of condenser 44 determines in part the selectivity of the receiver. To prevent radio frequency from circulating in the B+ line, a radio frequency choke 46 is provided, the lower end of which is held at radio frequency ground by a condenser 48.

From the circuit described thus far the operation of the oscillator is apparent. Antenna loop 13 induces radio carrier frequency voltage (ultra high frequency in the present case) in rods 22 and 24 which are tuned by variable condenser 26. Plate 30 is held at B+ potential by the connection with B+ through rod 22. Cathode 36 is connected to ground through transformer 40 thus completing the anode excitation circuit. The output power fed back to grid 32 causes the tube to oscillate at the frequency of the tuned circuit.

The transformer 40 includes a secondary coil 50 connected to the cathode lead 52 at one end and grounded at the other. A by-pass condenser 54 provides carrier frequency ground for any superregenerative oscillator frequency which passes through radio frequency choke 38, but does not ground the quench frequency. The other half of the transformer includes a primary coil 56 having a condenser 60 connected to the ends to form a tuned circuit at the quench frequency. In an ultra high frequency receiver of about 100 megacycles this quench frequency may be about 125 kilocycles. The transformer has a powdered iron core and a powdered iron case to attain substantially unity coupling between the two coils.

The quench oscillator includes two tubes 62 and 64 connected in a negative resistance push pull arrangement, with the plates connected to tuned circuit 56 and 60. The oscillator differs from the usual circuit in that the plate 67 of tube 64, is grounded for radio frequency by a connection 69 to B+. This necessitates the operation of the cathodes above radio frequency ground, accomplished by radio frequency choke 72. Feedback is obtained by connecting the grid 65 of tube 64 with the plate 63 of tube 62 through a condenser 66. The grid 61 of the tube 62 is grounded for quench frequency energy by the capacitor 68 as is the anode 67 of the tube 64 by the by-pass capacitor 48, while anode 63 of tube 62 is supplied with direct current energy through the primary 56 of the transformer 40 and the potential variations at anode 63 are impressed on the control grid 65 of tube 64 by the coupling capacitor 66. Oscillation producing feed back coupling is introduced by virtue of the common cathode impedance 72 and the coupling capacitor 66. Should the voltage across choke 72 rise slightly, both grids 61 and 65 are biased more negatively causing a rise in the voltage at anode 63 which is impressed on the grid 65 to further increase the cathode voltage and so on until the end of the oscillation characteristic is reached when the reverse train of phenomena occurs. The current changes through the choke 72 due to the tube 64 predominate as the voltage changes applied to tube 64 are greater than those applied to the tube 62 by a ratio equal to the circuit amplification factor of tube 62. The direct current path between grid 61 and its associated cathode is completed through grid leak resistor 70 connected between grid 61 and ground and the direct current path between grid 65 and its associated cathode is completed through grid leak resistor 73 connected between grid 65 and ground. As in most oscillators, the oscillations produced by tubes 62 and 64 increase in amplitude until the circuit losses equal the input power and, since the control grids of the tubes are driven into the positive region, there flows through each of the grid leak resistors 70, 73 a uni-directional current component proportional to the oscillation intensity. Any suitable type oscillator may be used for producing quench voltage but the present oscillator is suitable for low voltage operation with wide variations in voltage while still maintaining substantially constant characteristics.

The antenna, the superregenerative oscillator, the quench oscillator, and the coupling between the quench oscillator and the superregenerative oscillator have been described. The means whereby the superregenerative oscillator tube 28 is caused to appear as an audio controlled impedance and means for transferring these impedance variations to the circuits of the quench frequency oscillator tubes 62 and 64 to influence the oscillation amplitude therein will now be described.

As is well known, the operation of a superregenerative oscillator in the absence of a received signal results in a group of oscillations at the tuned frequency of the superregenerative oscillator, one group occurring at every cycle of the quench voltage. In the present circuit these oscillations are quenched every time the cathode 36 is driven positive by the quench oscillator. Since radio frequency choke 38 is placed in the cathode connection to secondary 50, the current passing through this secondary is direct current pulsating at the quench frequency. Upon the reception of a signal by the superregenerative oscillator, the group of oscillations is initiated sooner, depending upon the strength of the received signal. If the received carrier is modulated to transmit intelligence, for example at an audio rate for voice or code, the intensity of the carrier will vary in response to the impressed modulation resulting in changes of the signal level impressed on the oscillator at an audio rate. This in turn results in larger and smaller groups of oscillations, producing an audio component upon the pulsating direct current passing through the secondary. Thus it would be possible to get a detected intelligence frequency directly out of the cathode circuit of the superregenerative oscillator.

Because of the lack of proper control of automatic volume control, fidelity and overload where the cathode current is used to obtain the intelligence bearing signal, this current is not utilized in the present invention. Instead, the variation of plate impedance is used to modulate the quench oscillator. Since transformer 40 is not an audio frequency transformer, the audio component of the cathode current cannot modulate the quench frequency in the conventional manner. For this reason, the plate impedance variation of the superregenerative oscillator, which is the impedance load into which the quench oscillator delivers power, is utilized to obtain a variation of voltage amplitude in the quench oscillations which is an audio amplitude modulation of the quench oscillations. This utilizes the superregenerative phenomenon of an increase of plate impedance (resulting in a decreased plate current) in the presence of a received signal. In other words, by increasing the load into which the quench oscillator delivers power, the amplitude of the quench voltage oscillations is varied resulting in modulation of the quench frequency.

Detection of the intelligence or audio modulation of the quench voltage in the quench oscillator is accomplished by use of the oscillator circuit components instead of introducing a separate detector tube for this purpose. The circuit characteristics which make this detection action possible will now be described. The use of an oscillator circuit in which the required feed back is provided by common cathode coupling permits operation of the circuit with plate 67 of tube 64 and grid 61 of tube 62 substantially at ground potential, which is accomplished by the connections previously outlined.

By making the reactance of the feedback condenser 68 small in comparison with the impedance of the tuned circuit 56, 60, the voltage at quench frequency appearing across the grid leak resistor 70 will be very small, while at the same time the current through the grid leak resistor 70 will be proportional to the voltage across the tuned circuit. Therefore the voltage across the grid leak resistor 70 will consist of a direct current pulsating at the intelligence bearing frequency. By virtue of the low reactance of condenser 68 compared to quench circuit 56, 60, little quench frequency appears across the resistance 70 and the pulsating direct current is nearly all at the intelligence bearing frequency. This voltage will be proportional to the degree of modulation of the received carriers.

A conventional triode amplifier tube 76 is coupled across resistance 70 and delivers its output to a transformer coil 78 connected to the anode supply. The other coil 80 of the transformer is connected to headphones 82 thus giving an output which is amplified so that it may be used. This novel grid detection in the quench oscillator is of a linear type, reproducing the signal transmitted intelligence very accurately.

The extreme fidelity of the invention is obtained by selecting a quench frequency with respect to the regenerative characteristics of the superregenerative oscillator so that the oscillations which occur when an unmodulated carrier is received are quenched just before reaching saturation. There is therefore very little current passing in the absence of intelligence modulating the carrier. When the carrier is modulated the result is a quicker build up in oscillations and since almost the entire oscillations in such case are the result of the intelligence, the resultant cathode current is a linear function of the intelligence in the carrier. The detection is linear, because the rapidity of build up is directly proportional to strength of the intelligence on the carrier. Experience has shown that very true reproduction with a negligible amount of amplitude distortion of the intelligence modulation can be expected with this arrangement over very large operating ranges of signal intensity, tube changes, voltage changes and detuning. The normally present amount of amplitude distortion resulting from this arrangement can be held to less than two per cent (square root of sum of the squares).

Inherent in the linear detection is poor automatic volume control since the result is directly proportional to the strength of the intelligence. The detection of the intelligence in the quench oscillator makes feasible A. V. C., while maintaining linear mode detection. One characteristic of grid leak superregenerative oscillators is that in the presence of a signal, the plate current decreases with a resultant increase in plate impedance. This impedance change, when properly related to the impedance of the quench oscillator produces very good automatic volume control.

Although the exact principle of operation is not definitely clear, it has been found that a proper proportioning of plate impedance of the superregenerative oscillator to the impedance of the quench oscillator gives very satisfactory automatic volume control with practically a flat characteristic. This impedance ratio also determines the overload characteristic of the superregenerative oscillator. Obviously, if the ratio of the detector impedance to the quench oscillator impedance is very great, there will be no modulation of the quench oscillation potentials as the loading will be negligible during all portions of the signal modulation cycle. On the other hand, if this ratio is too low, no automatic volume control action occurs. A small amount of experimental work soon establishes the proper impedance ratio. The impedance ratio, by its effect on the loading of the quench oscillator also determines the oscillation amplitude of the quench oscillator, and variations in the cathode or plate impedance of the superregenerative detector brought about by variations in the incident signal intensity are reflected in corresponding variations of the quench oscillator amplitude produced by the varying load reflected on the latter oscillator.

Thus, by the transfer of intelligence modulation controlled impedance variations to the quench oscillator and derivation of a unidirectional potential proportional to the oscillation amplitude of the said quench oscillator it is possible, with a properly selected ratio of the impedance of the superregenerative oscillator to the source impedance of the quench oscillator to linearize the normally logarithmic response characteristic of the superregenerative oscillator considered alone. As the absolute magnitude of these impedances will vary with the tube type employed, the losses in the circuit components used and the operating voltages, the most favorable value is best determined experimentally, although, by the making of certain assumptions it may be possible to mathematically compute a reasonably favorable starting value. In general, a design in which the reflected impedance of the superregenerative oscillator in the presence of the average carrier intensity to be anticipated is substantially equal to the source impedance of the quench oscillator will serve as a base from which final experimental determinations may be made.

Although the invention has been described with relation to a particular embodiment thereof, it is not limited to the same, nor is it otherwise limited except by the terms of the following claims.

We claim:

1. In radio receiving apparatus, signal intercepting means adapted to intercept intelligence modulated carrier energy, an oscillating detector operating at the carrier frequency coupled to said signal intercepting means and having a cathode-anode impedance which is a function of the carrier voltage impressed thereon, a quench oscillator separate from said detector and having an oscillation amplitude varying with the impedance connected thereto, means coupling said quench oscillator to the cathode-anode circuit of said oscillating detector whereby the oscillations of said detector are periodically interrupted and coupling the cathode-anode impedance of said oscillating detector to said quench oscillator, and means for deriving a replica of the envelope of the oscillations generated by said quench oscillator, said coupling means comprising as a sole connection between said oscillating detector and said quench oscillator means having high impedance at the carrier frequency relative to its impedance at the quench frequency whereby quench frequency variations in the impedance of the oscillating detector are effective on the quench oscillator but carrier frequency variations are blocked from the quench oscillator.

2. In radio receiving apparatus, signal intercepting means adapted to intercept an intelligence modulated carrier, an oscillating detector operating at the carrier frequency coupled to said signal intercepting means and having a cathode-anode impedance which is a function of the carrier voltage impressed thereon, a quench frequency oscillator having an oscillation amplitude varying with the impedance connected thereto, coupling means having relatively high coupling efficiency in the region of the quench frequency and relatively low coupling efficiency for all other frequencies including the intelligence modulation frequencies, means interconnecting said coupling means between said quench oscillator and the cathode-anode circuit of said oscillating detector whereby the oscillations of said detector are periodically interrupted and the cathode-anode impedance of said oscillating detector is coupled to said quench frequency oscillator, and means for deriving a voltage controlled by the envelope of the oscillations executed by said quench frequency oscillator.

3. In radio apparatus, signal intercepting means adapted to intercept an intelligence modulated carrier, an oscillating detector operating at the carrier frequency coupled to said signal intercepting means and having a cathode-anode impedance which is a function of the carrier voltage impressed thereon, a grid current biased quench frequency oscillator having an oscillation amplitude varying with the impedance connected thereto, coupling means having relatively high coupling efficiency in the region of the quench frequency and relatively low coupling efficiency for intelligence modulation frequencies, means interconnecting said coupling means between said quench oscillator and the cathode-anode circuit of said oscillating detector whereby the oscillations of said detector are periodically interrupted and the cathode-anode impedance of said oscillating detector is coupled to said quench frequency oscillator, and means for deriving an intelligence voltage from the grid current flowing in said quench frequency oscillator.

4. In radio apparatus, signal intercepting means adapted to intercept an intelligence modulated carrier, a grid current biased oscillating detector operating at the carrier frequency coupled to said signal intercepting means and having a cathode-anode impedance which is a function of the carrier voltage impressed thereon, a grid current biased quench frequency oscillator having an oscillation amplitude varying with the impedance connected thereto, coupling means having relatively high coupling efficiency in the region of the quench frequency and relatively low coupling efficiency for intelligence modulation frequencies, means interconnecting said coupling means between said quench oscillator and the cathode-anode circuit of said oscillating detector whereby the oscillations of said detector are periodically interrupted and the cathode-anode impedance of said oscillating detector is coupled to said quench frequency oscillator, and means for deriving an intelligence voltage from the grid current flowing in said quench frequency oscillator.

5. In radio apparatus, signal intercepting means adapted to intercept an intelligence modulated carrier, a grid current biased oscillating detector operating at the carrier frequency coupled to said signal intercepting means and having a cathode-anode impedance which is a function of the carrier voltage impressed thereon, a grid current biased quench frequency oscillator having an oscillation amplitude varying with the impedance connected thereto, bilateral coupling means having relatively high coupling efficiency in the region of the quench frequency and relatively low coupling efficiency for intelligence modulation frequencies, means interconnecting said coupling means between said quench oscillator and the cathode-anode circuit of said oscillating detector whereby the oscillations of said detector are periodically interrupted and the cathode-anode impedance of said oscillating detector is coupled to said quench frequency oscillator, and means for deriving an intelligence voltage from the grid current flowing in said quench frequency oscillator.

6. In signal responsive apparatus, signal responsive means having an impedance varying with the envelope amplitude of an impressed signal, means for impressing signal energy on said signal responsive means, an oscillator separate from and connected with said signal responsive means and oscillating at a frequency substantially different from that of said signal energy with an oscillation amplitude varying with the impedance of said signal responsive means, and means for deriving a replica of the envelope of the oscillations generated in said oscillator, the connection between said signal responsive means and said oscillator comprising means having high impedance at the signal frequency relative to its impedance at the frequency of said oscillator whereby variations in the impedance of said signal responsive means at said oscillator frequency are effective on the oscillator but signal frequencies are blocked from said oscillator.

7. In signal responsive apparatus, signal responsive means having an impedance varying with the envelope amplitude of an impressed signal, means for impressing signal energy on said signal responsive means, an oscillating circuit separate from said signal responsive means and having an oscillation frequency substantially different from that of impressed signals and an amplitude varying with the impedance of a portion of said oscillating circuit, and means coupling said portion of said oscillating circuit to said signal responsive means, said oscillator including an electric discharge device having at least a cathode, a control grid and an anode, a resistor traversed by unidirectional current flowing to said grid, and means responsive to the voltage changes appearing across said resistor, said coupling means comprising as the sole connection between said signal responsive means and said oscillating circuit means having high impedance at the signal frequency relative to its impedance at the oscillator frequency whereby variations in the impedance of said signal responsive means at said oscillator frequency are effective on said oscillating circuit but signal frequency variations are blocked from said oscillating circuits.

HENRY T. WINCHEL.
EDMUND R. ROBUCK.

REFERENCES CITED

The following references are of record in the file of this patent:

UNITED STATES PATENTS

| Number | Name | Date |
|---|---|---|
| 2,091,546 | Hruska | Aug. 31, 1937 |
| 2,160,663 | Jensen | May 30, 1939 |
| 2,171,148 | Percival | Aug. 29, 1939 |
| 2,410,981 | Koch | Nov. 12, 1946 |

FOREIGN PATENTS

| Number | Country | Date |
|---|---|---|
| 450,150 | Great Britain | July 6, 1936 |